Patented Dec. 23, 1952

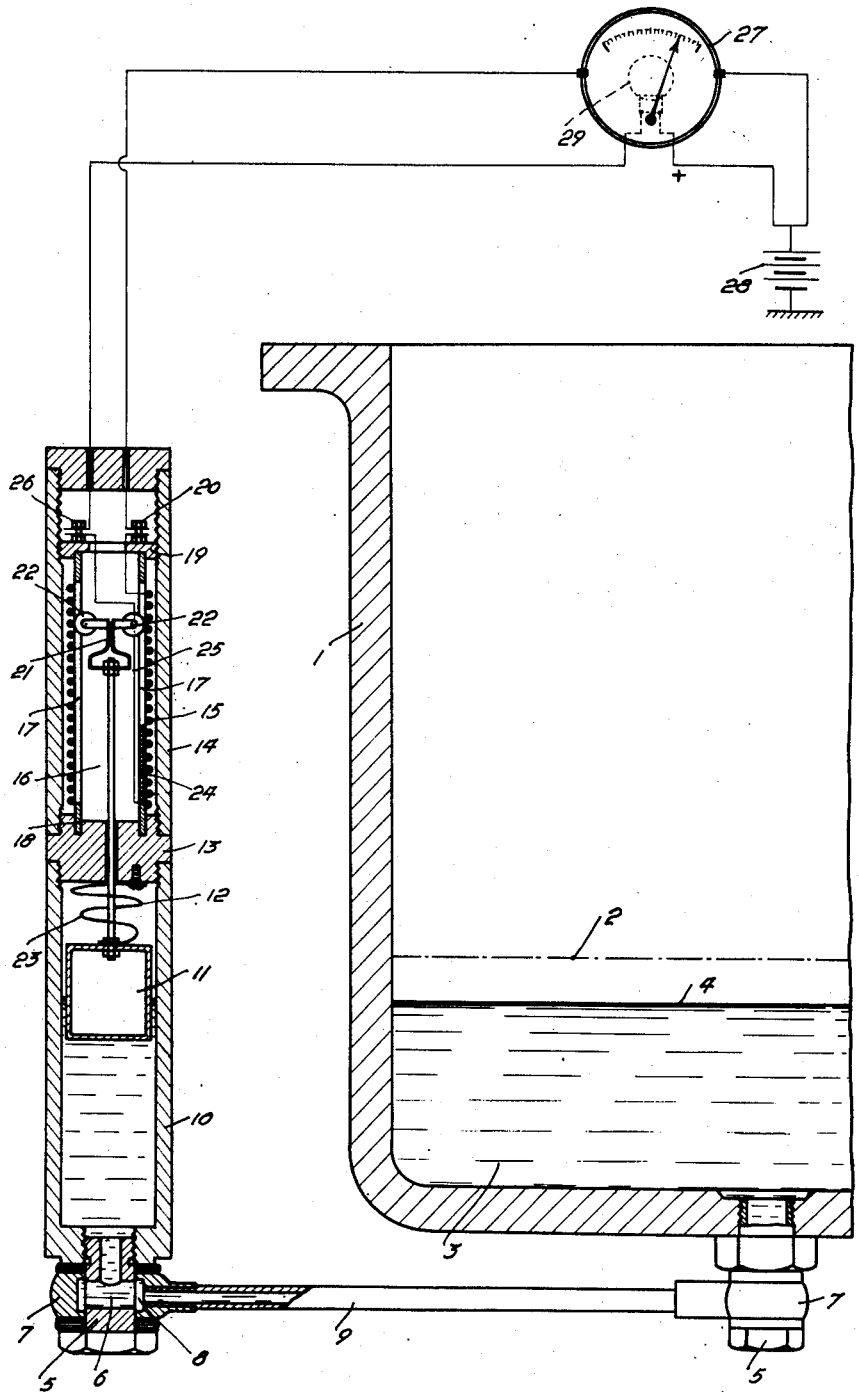

2,623,143

UNITED STATES PATENT OFFICE 2,623,143

ARRANGEMENT FOR INDICATING THE LEVEL OF OIL IN THE CRANKCASES OF MOTOR CARS AND THE LIKE VEHICLE ENGINES

Hervé Laury, St. Cloud, France

Application October 11, 1950, Serial No. 189,626
In France March 21, 1950

2 Claims. (Cl. 201—48)

Motorcars and the like machines driven by internal combustion engines that are provided with oil circuits include instruments for indicating the pressure of oil in the lubricating circuits, but such control devices are not sufficient because, whenever the driver forgets to proceed with a periodical checking or in the case of an abnormal consumption or for the like fortuitous reason, the volume of oil contained in the crank case of the engine diminishes, the oil becomes hot and its lubricating capacity is reduced and it may even reach a dangerous temperature although the value of the oil pressure remains sufficient as the pump that is fed through the bottom of the crank case remains properly fed under such circumstances. It is, therefore, essential for reliability in operation of the vehicle to always make sure of the amount of oil actually stored in the casing.

To this end, the engine crank-cases on extant vehicles are sometimes provided with a level indicator constituted by a float located in the casing and controlling a rod adapted to move in front of a scale; but generally a mere gauge is used.

Such float arrangements are of a difficult execution as such a float located in the vicinity of the operative connecting rods should be confined within a very reduced space and, furthermore, the level of oil can be ascertained only when the engine is inoperative.

The gauge systems used heretofore are extremely inconvenient and require a cleaning of the gauge before it is used, which dirties the hands of the driver; they can also be resorted to only when the vehicle is at a standstill.

My invention has for its object to remove these drawbacks and to provide an oil level indicator adapted to be fitted on the dashboard and to provide accurate indications, whether the car or vehicle is running or otherwise.

This problem is all the more difficult to solve as the indications given should be accurate in spite of the splashing of the oil through the engine crank case and in spite also of the longitudinal oscillations in the mass of oil as produced through the accelerations and decelerations of the vehicle.

The chief feature of my invention resides in the fact that the measure of the oil level is performed inside an auxiliary container that is in static equilibrium with reference to the main container or crank case through the agency of a connection that wipes out, as far as possible the dynamic variations in level, i. e. said connection has a small cross section with reference to the cross section of the auxiliary container and/or a considerable length. This auxiliary container may be executed in any suitable manner and occupy various positions; it may be fitted laterally on the main container or else be formed in one with the wall of the latter, e. g. when the latter is cast or stamped or again it may be connected with the bottom of the main container through an opening of a small diameter or through a pipe opening in the vicinity of the lowermost point of the main container; in fact, in the case of certain other applications, the auxiliary container may be inserted inside the actual main container.

When it is desired to fit the auxiliary container on pre-extant crankcases or containers, it may be connected with the lower part of the engine crankcase through a pipe that opens preferably into the engine crankcase through a three-way pipe that takes the place of the usual drain plug.

The auxiliary container is preferably connected with the lowermost point of the crankcase that lies substantially in vertical register with the center of gravity of the surface of the liquid inside the main container and said arrangement allows, moreover, removing to a substantial extent the action of the accelerations and decelerations of the vehicle; as a matter of fact, if it is supposed that the surface of the liquid remains in a plane during the accelerations, which is true as a first approximation, the height of the liquid in register with the center of gravity of the liquid surface does not vary. The auxiliary container is then preferably located in a plane passing through said center of gravity and perpendicular to the axis of displacement of the main container.

The modifications in the level in the auxiliary container are measured either through a float arrangement wherein the float carries along with it a contact piece assuming a rectilinear movement and cooperating with a resistance or else through any other distant measuring devices of a known type such as those that resort to capacity-modifying phenomena or various other types of float arrangements.

In a preferred embodiment of the float-operated contact system, I use two contact-making knurled wheels that are mounted on the float and are electrically interconnected with one another and urged elastically each against an electric lead, at least one of said leads forming a resistance the value of which varies in accordance with the vertical location of the float.

Lastly, according to a further modification of the arrangement, I may use a so-called potentiometric electric wiring, whereby it is possible to use a voltmeter of the usual type the scale of which reads in heights of oil level.

A further improvement consists in controlling through the float or through a member rigid with the latter an electric switch feeding a signalling or alarm device carried by the dashboard, so as to energize said device when the oil level drops underneath a predetermined critical height.

I will now describe by way of example various embodiments of the level indicator according to my invention, reference being made to accompanying drawings, wherein:

The figure is a cross-sectional view of a float-carrying device connected with the location of the draining plug of the oil container.

Turning to the drawing, the oil-containing crankcase 1 wherein the oil level may lie between a higher level 2 and a lower level 3 corresponding to a substantially empty crankcase, is supposed to be filled with oil up to a level 4.

Said crankcase is provided in its lower wall with a tapped opening for the drain plug, and in said tapped opening is screwed the end of an intermediary connection 5 constituted by a threaded cylinder with a six-sided head, provided near said head with a transverse cylindrical bore 6 and adapted to carry a ring-shaped connection 7, the radial bore 8 in which connects the bore 6 with a pipe 9. The pipe 9 opens into the radial bore 8 of a second intermediary connection fitted at the lower part of a tube 10 secured to the side of the crankcase. Inside said tube 10 is housed a float 11 carrying a vertical rod of electrically conductive metal 12 that passes through a further connecting member 13 forming an upper plug inside the tube 10 and also the bottom of a second tube 14. An electric resistance 15 is wound inside said second tube 14 round an insulating tube 16. Said tube 16 is longitudinally cut to form slots 17 along two diametrically opposite generating lines of the tube. The insulating tube 16 is held fast inside a groove 18 that is provided in the upper surface of the connection 13 and inside a spacing ring 19 at the upper end of the said tube 16. One end of the resistance 15 is connected with a terminal 20. The upper end of the rod 12 carries a light elastic fork 21 constituted by a thin strip of steel, each arm of the fork carrying in its turn a wheel 22. The two wheels engage the corresponding slot 17 on the inside of the tube 16 and bear thus against the resistance 15 at two diametrically opposed points thereof.

The rod 12 carried by the float 11 is connected in its turn by a yielding electric lead 23 with the ground constituted by the mass of the apparatus. Furthermore, a small plate 24, the part played by which will be disclosed hereinafter, is located in front of the lower end of one of the slots 17 and is connected through the lead 25 with a further terminal 26.

The resistance terminal 20 is connected with an ammeter 27 the scale of which reads in heights of oil level and the other terminal of the ammeter is connected with the positive terminal of the battery 28. The terminal 26 is connected with one of the poles of an alarm lamp or the like signal 29, the other pole of which is also connected with the positive pole of the battery.

When the oil level in the crankcase varies, the float 11 is submitted to said variations that are obviously transmitted to the auxiliary container after damping, however, through the passage of the oil through the connections 5 and 7 and through the pipe 9, so as to cut out any sudden fortuitous modification of the level in the auxiliary container.

The displacements of the float are transmitted through the rod 12 to the wheels 22 and the length of the resistance 19 inserted between said wheels and the terminal 20 in the circuit of the ammeter 27 decreases consequently when the oil level increases, whereby the value of the current intensity passing through the ammeter 27 increases.

When the oil level drops underneath its critical value, the plate 24 is grounded through the movable set constituted by the wheels 22 and the lamp 29 or the like alarm signal is energized.

What I claim is:

1. In an indicator means for indicating oil levels, a float chamber, a float in said chamber vertically movable by changes of oil level in said chamber, a chamber above said float chamber, a wall between said chambers having a vertical passage therethrough, a rod having its lower end rigidly attached to the float and extending upwardly through said passage, a resistance coil extending upwardly from adjacent said wall, the said rod positioned for axial movement vertically within said coil, a double-pronged forked spring attached to the upper end of said rod, the prongs of said spring extending radially from said rod, a wheel mounted for rotation on the end of each prong, the wheels having their edges in frictional engagement with the inside of said coil on diametrically opposite sides thereof and movable in a straight line on said coil by movement of the float, and the said coil, wheels, spring, rod and wall forming a part of an electric circuit for connection with an electrical indicator.

2. In an indicator means for indicating oil levels, a float chamber, a float in said chamber vertically movable by changes of oil level in said chamber, a chamber above said float chamber, a wall between said chambers having a vertical passage therethrough, a rod having its lower end rigidly attached to the float and extending upwardly through said passage, a resistance coil extending upwardly from adjacent said wall, the said rod positioned for axial movement vertically within said coil, a double-pronged forked spring attached to the upper end of said rod, the prongs of said spring extending radially from said rod, a wheel mounted for rotation on the end of each prong, the wheels having their edges in frictional engagement with the inside of said coil on diametrically opposite sides thereof and movable in a straight line on said coil by movement of the float, and the said coil, wheels, spring, rod and wall forming a part of an electric circuit for connection with an electrical indicator, and separate conductor means positioned at the lower end of said coil for separate contact with said wheels and for establishing with a signal a separate circuit through said wheels, spring, rod, and wall.

HERVÉ LAURY.

REFERENCES CITED

The following references are of record in the file of this patent:

UNITED STATES PATENTS

| Number | Name | Date |
| --- | --- | --- |
| 1,081,033 | Ferguson | Dec. 9, 1913 |
| 1,395,682 | Kitchen | Nov. 1, 1921 |
| 1,434,393 | Martin | Nov. 7, 1922 |
| 1,476,289 | Feder | Dec. 4, 1923 |
| 1,586,201 | Kauffmann | May 25, 1926 |
| 1,729,770 | Eynon | Oct. 1, 1929 |
| 1,768,446 | Gron | June 24, 1930 |
| 2,147,500 | Rothenberger et al. | Feb. 14, 1939 |
| 2,533,091 | Campani | Dec. 5, 1950 |